Patented May 5, 1931

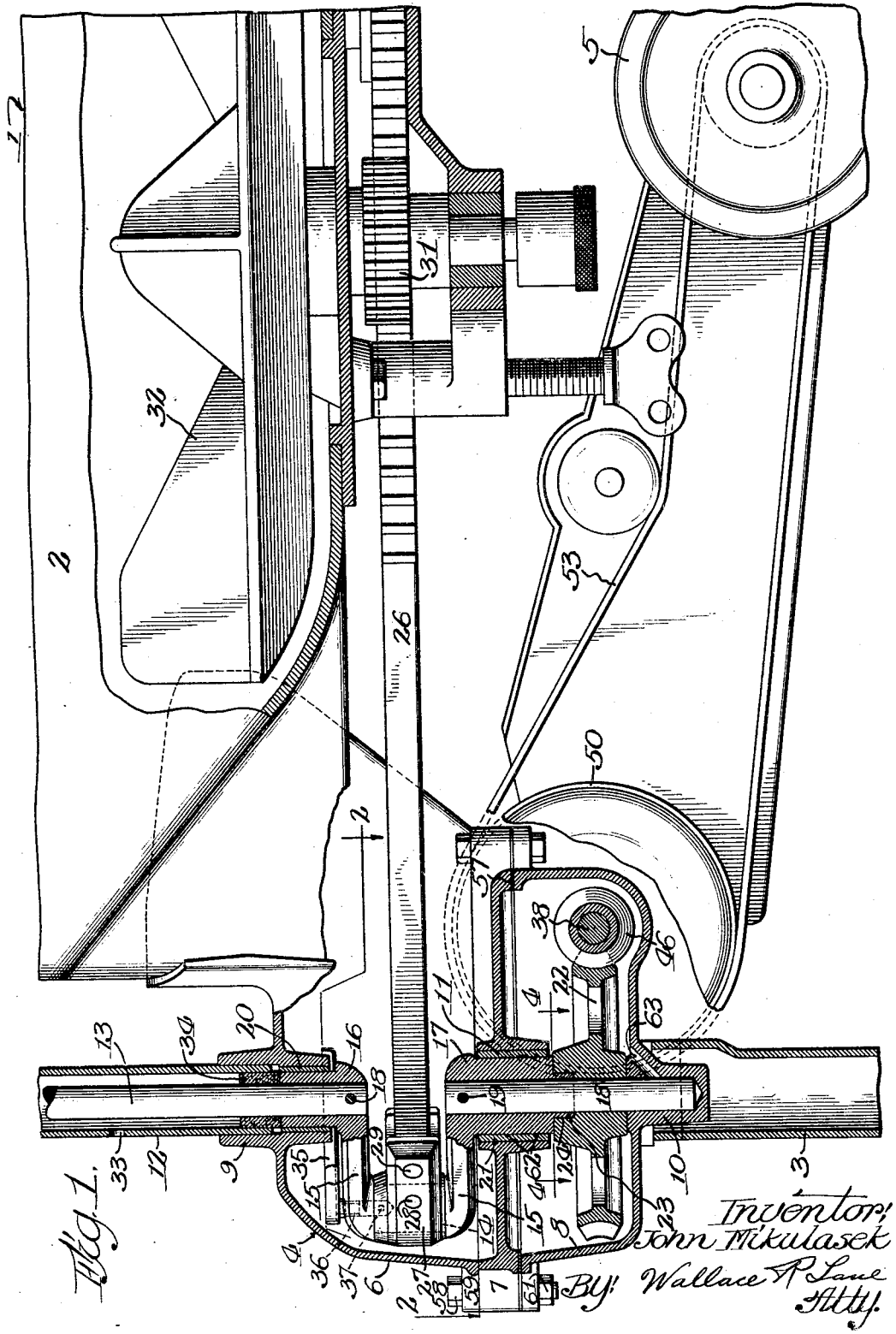

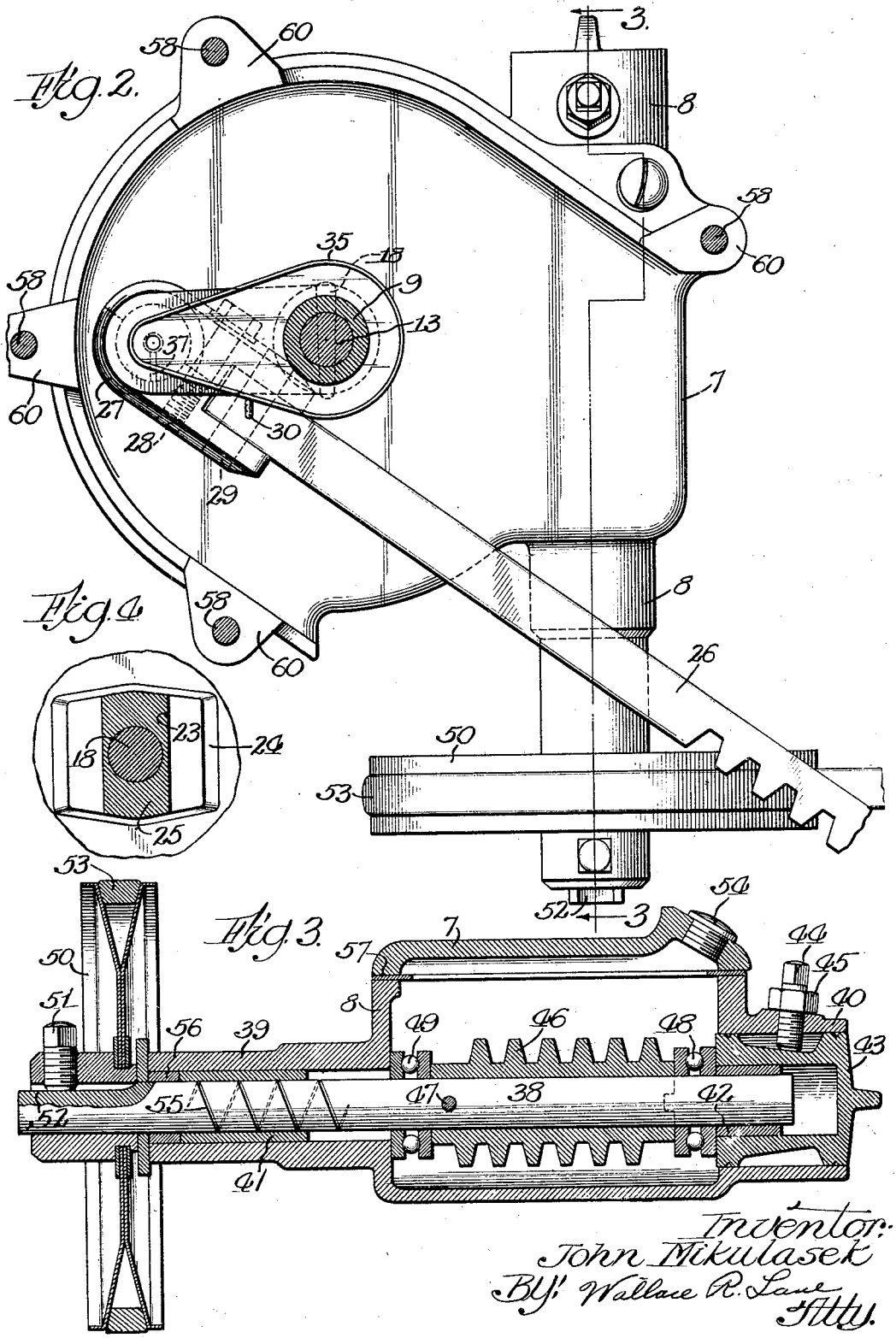

1,803,974

UNITED STATES PATENT OFFICE

JOHN MIKULASEK, OF NEWTON, IOWA, ASSIGNOR TO THE MAYTAG COMPANY, OF NEWTON, IOWA, A CORPORATION OF DELAWARE

DRIVING MEANS FOR WASHING MACHINES

Application filed March 20, 1929. Serial No. 348,534.

The present invention relates to driving means which while of general application, is particularly adaptable for washing machines.

Among the objects of the invention is to provide a novel driving mechanism in a washing machine, and particularly a novel crank in the driving means. When cranks are constructed from connected parts, namely, the pin part, the arms and the journal or stud parts, these parts become loose under the stresses of operation and lost play and wear, and frequently damage, as well as noise are produced.

It is an object of my invention to avoid and eliminate such defects and disadvantages by preferably making and using a unitary crank structure, as a one-piece crank, with the parts, such as the pin or pintle, the arms and bearing portions, all structurally and operatively integral. This will also provide for a more compact, simple, strong and quiet means for transmitting power from the power source to the mechanisms to be operated in the machine, such as the dolly and wringer of a washing machine.

The invention also comprehends with or without the use of a one piece crank, a novel housing particularly adapted to house the driving mechanism and to exclude dust, dirt, and other foreign matter, and also to carry the lubricant for the moving parts therein. A feature of this part of the invention is to so locate the driving means, such as the crank and drive therefor, at an advantageous point or locus for efficient transmission of power. In the embodiment chosen to illustrate the invention, this is located in a supporting leg of the machine, this leg being referred to as the power leg. It preferably has an enlargement forming the housing for the driving means, and preferably carries the bearings for the crank and other drive parts. The power leg is preferably rigidly fixed to the tub of the machine and its enlargement preferably comprises an upper housing section, a lower housing section and an intermediate part serving as a partition, each part carrying a bearing means, the upper part for a wringer shaft and upper hub of the crank, the lower part for a drive shaft, and the intermediate part for the lower hub of the crank and the connected upper end of the drive shaft. When these housing parts are rigidly connected together the shafts are alined and the crank balanced. This construction also provides for facile assembly of the parts.

As another feature of the invention, with or without a single piece crank, is to provide the power leg enlargement or housing for the drive means with a housing extension for the enclosing and rigid supporting of the drive device from the source of power to the crank. In the specific illustrative embodiment, this extension houses a worm driven by a motor or the like, and a worm gear driven by the worm and connected to the drive shaft secured to the crank. This makes for a compact, self-contained and strong means for the power driving device.

My invention further provides a novel construction in the driving pulley attached to the driving gearing which insures the positive transmission of power from the power means on the washing machine to the driving mechanism; further to provide a driving mechanism of maximum simplicity, efficiency, economy, and ease of operation; and such further objects, advantages and capabilities as will later more fully appear, and which are inherently possessed thereby.

Referring to the drawings:

Fig. 1 is a view in vertical cross section of a power leg built in conformity with my invention and showing my driving mechanism in the same, as attached to a washing machine with parts broken away to show the relative positioning of my mechanism to the other parts of the washing machine being driven thereby.

Fig. 2 is a horizontal cross sectional view taken through the power leg and in planes represented by lines 2—2 of Fig. 1.

Fig. 3 is a vertical cross sectional view taken through the driving gearing and in a plane represented by the line 3—3 of Fig. 2.

Fig. 4 is a horizontal cross sectional view taken in a plane represented by line 4—4 of Fig. 1, and showing the means of coupling the driving shaft to the one-piece crank.

Referring now more in detail to the drawings, the embodiment selected to disclose the invention is applied to a washing machine 1, provided with a tub 2 of suitable construction and supported by legs 3, one of which legs being shown with a casing or housing 4 constructed in accordance with the invention and for enclosing driving mechanism driven by power means 5 suitably supported on frame-work of the washing machine 1.

The casing or housing 4 comprises an upper housing portion or section 6, an intermediate partition or section 7 and a lower housing portion or section 8. The casing or housing 4 is designed to contain a driving mechanism and to protect it from dirt and dust, and forms an integral portion of the power leg 3. The upper housing section 6 is suitably secured or fixed, as by welding, riveting or the like, to the tub 2 of the washing machine 1, and is provided with a bearing 9, the lower housing section 8 likewise being provided with a bearing 10, and the intermediate partition 7 with a bearing 11. When assembled to form the multi-part casing 4, the lower bearing 10 is positioned in the hollow leg 3, and is suitably connected thereto. The bearing 9 of the upper housing section 6 is in association with the upper hollow portion 12 of the leg 3, such part 12 encasing a vertical wringer shaft 13 connected to a wringer mechanism (not shown).

A one-piece crank having a pintle portion 14, arm portions 15 and elongated hubs 16 and 17, is adapted to rotate in bushings 20 and 21 of the bearings 9 and 11 respectively. The hub 16 is adapted to receive the shaft 13 which is securely connected therewith by the pin 18 passing through the hub and shaft. A stub shaft 18 is inserted into the hollow hub 17 and connected thereto by the pin 19.

The stub shaft 18 is pressed into the bore of a worm gear 22, located in the lower compartment formed by the housing 8 and intermediate partition 7, and is driven by mechanism which will be subsequently explained.

Torque is transmitted to the crank from gear 22 by a coupling consisting of a slotted part 23 formed on the hub 24 of the gear, and a tongue part 25 formed on the hub 17. The lower end of the stub shaft 18 rotates in the bearing 10 of the housing 8.

A rack bar 26 is connected to the pintle 14 of the one-piece crank, by a split knuckle bearing 27 secured to the end of the rack bar by a bolt 28 and a wrist pin 29 held in place by a cotter pin 30, the bearing 27 rotatably receiving the pintle part 14 of the crank. The rack 26 normally meshes with a gear 31 and imparts an oscillating or alternately rotary movement to a dolly or agitator 32 in the tub 2, when the crank is rotated. The crank likewise transmits rotation to the wringer shaft for driving the wringer (not disclosed) and other auxiliary wringer mechanism. An oil hole 33 is provided in the upper leg portion 12 for inserting oil which is absorbed by the felt 34 around the bearing 9 and in association with the bushing 20. The oil gradually seeps through and around the bushing 20 and then caught in an oil pan 35 leading to a nipple 36 extending into a hole 37 leading to the bearing surface of the pintle 14.

A driving shaft 38 is provided in the lower housing 8 and journalled in extended portions 39 and 40 of the housing, such shaft being rotatable in bushings 41 and 42 in said extended portions 39 and 40. A thrust cap 43 positioned in the extended portion 40 is held in adjusted position by a set screw 44 cooperating with a tapered neck portion of the thrust member, the screw 44 being suitably locked by a lock nut 45. A drive worm 46 is mounted on the shaft 38 and fixed thereto by a cross pin 47. The main thrust of the worm is exerted on the thrust cap 43 through a thrust ball bearing 48, while the reacting thrust, due to the racing and underrunning of the machine, is taken up by a thrust ball bearing 49, and sustained by the casing 8. A sheave pulley 50 is mounted on the extended portion of the shaft 38 and secured thereto by a set screw 51 applied to a flattened surface 52 of the shaft.

A flexible pulley belt 53, connected to the power means 5, frictionally engages the sheaves of the sheave pulley 50, and drives the worm gear 46 and the mechanism associated therewith.

The bearings in this lower housing are lubricated by grease inserted into the lower chamber through a removable cap screw 54 in the housing 7. In order that this grease and lubricant will not escape through bearing 41, the journalled portion of the shaft 38 at that point is provided with an oil groove 55 running helically on the surface thereof in a reversed direction to the direction of rotation. A packing washer 56 adjacent to the exterior end of the bearing 41 and held in position by the fibre washer 39 further prevents the escape of the grease and lubricant within the lower chamber.

A gasket 57 is provided between the lower housing 8 and intermediate partition 7 and is held in place, together with the parts of the casing 4 when assembled, by bolts 58. These bolts 58 pass through lugs 59 around the circumference of the housing 6, the partition 7. Lugs 60 are similarly positioned around the circumference of the lower housing 8 and are tightened by a nut 61 engaging the bolt 58. The gasket 57 prevents the escape of grease and lubricants in the lower chamber.

The bearing 11 is lubricated by the capillary attraction and the swelling of the lubricant contained in the lower chamber, the excess of which works back into the chamber by a reversed spiral oil groove 62 in the bearing 11. Lubricant is supplied to bearing 11 by a duct 63 from the chamber of section 8.

The upper housing 6 encloses the rotating crank and pitman 26 and is provided with an opening at one side so that the pitman 26 is free to swing arcuately as the crank is revolved. Suitable means may be provided for normally holding the rack 26 in mesh with the dolly gear 31.

While I have herein described and upon the drawings shown an illustrative embodiment of the invention, it is to be understood that the invention is not limited thereto, but may comprehend other constructions, arrangements of parts, details and features without departing from the spirit of the invention.

Having thus disclosed the invention, I claim:

1. In a washing machine, a leg rigid therewith, said leg having chambered parts comprising a multi-piece casting, said pieces being provided with bearings, a one-piece crank having hub portions journalled in the walls of one of said parts, and driving means journalled in the walls of the other of said parts for driving said crank.

2. In a washing machine, a leg rigid therewith, said leg having chambered parts comprising a multi-piece casting, said pieces being provided with bearings, a one piece crank provided with hubs journalled in the walls of one of said parts, means connected to one of said hubs for rotating said crank, and means connected to the other of said hubs for driving an auxiliary mechanism of the washing machine.

3. In a washing machine, a leg rigid therewith, said leg having chambered parts comprising upper, lower and intermediate castings, said castings being provided with bearings, a one-piece crank having elongated hub portions journalled in said upper and intermediate castings, and driving means journalled in the lower of said castings and engaging an elongated hub portion of said crank for operating said crank.

4. A washing machine operating mechanism comprising a supporting leg for the machine having spaced apart bearing portions, a crank piece provided with a pintle member and integral parallel arm portions extending therefrom, the free ends of said arms having oppositely extended aligned hubs rotatably mounted in the bearing portions of said leg, means engaging one of said hubs to rotate the crank piece, and power take-off means engaging the pintle member.

5. A washing machine operating mechanism comprising a crank piece consisting of a pintle member having integral parallel arm portions, the free ends of which are provided with hubs, a stub shaft, a drive wheel mounted on said stub shaft and engaging an end of one of said hubs, so that the crank piece will be rotated, means including the last mentioned hub for supporting said stub shaft, and power take-off means connected with said pintle member.

6. A washing machine operating mechanism comprising a crank piece having parallel crank arm portions, the free ends of which are provided with oppositely extended hub members, a rotatably supported stub shaft engaging one of said hub members, a drive wheel mounted on said stub shaft, said drive wheel and the adjacent end of the last mentioned hub member having complemental means for preventing relative rotation, so that rotation of the drive wheel will impart rotation to the crank piece, and power take-off means connected with said crank piece.

7. In a washing machine, a leg rigid therewith, said leg having upper and lower chambers, the walls of which are provided with a aligned bearings, a one piece crank having oppositely disposed hubs journaled in the bearings provided in the walls on the upper chamber, a stub shaft having one end mounted in the wall bearing of the lower chamber, and its upper end mounted in the adjacent hub of the crank piece, and a worm gear mounted on said stub shaft and operatively engaging said crank piece.

In witness whereof, I hereunto subscribe my name to this specification.

JOHN MIKULASEK.